United States Patent
Wolfram et al.

(10) Patent No.: US 8,788,524 B1
(45) Date of Patent: *Jul. 22, 2014

(54) METHOD AND SYSTEM FOR RESPONDING TO QUERIES IN AN IMPRECISE SYNTAX

(75) Inventors: Stephen Wolfram, Champaign, IL (US); Oyvind Tafjord, Eugene, OR (US)

(73) Assignee: Wolfram Alpha LLC, Champaign, IL (US)

( * ) Notice: Subject to any disclaimer, the term of this patent is extended or adjusted under 35 U.S.C. 154(b) by 315 days.

This patent is subject to a terminal disclaimer.

(21) Appl. No.: 12/780,705

(22) Filed: May 14, 2010

Related U.S. Application Data

(60) Provisional application No. 61/178,853, filed on May 15, 2009.

(51) Int. Cl.
G06F 17/30 (2006.01)

(52) U.S. Cl.
USPC ........... 707/779; 707/737; 707/748; 707/749; 707/754

(58) Field of Classification Search
USPC .......... 707/779, 769, 736, 737, 748, 749, 754
See application file for complete search history.

(56) References Cited

U.S. PATENT DOCUMENTS

| | | | |
|---|---|---|---|
| 6,038,560 A * | 3/2000 | Wical | 1/1 |
| 6,076,051 A * | 6/2000 | Messerly et al. | 704/9 |
| 6,584,464 B1 * | 6/2003 | Warthen | 1/1 |
| 6,675,159 B1 * | 1/2004 | Lin et al. | 1/1 |
| 6,704,728 B1 | 3/2004 | Chang et al. | |
| 2004/0049499 A1 * | 3/2004 | Nomoto et al. | 707/3 |
| 2005/0080780 A1 | 4/2005 | Colledge et al. | |
| 2007/0106657 A1 | 5/2007 | Brzeski et al. | |
| 2007/0208722 A1 | 9/2007 | Dettinger et al. | |
| 2008/0016040 A1 | 1/2008 | Jones et al. | |
| 2008/0066052 A1 * | 3/2008 | Wolfram | 717/109 |

OTHER PUBLICATIONS

Office Action for related U.S. Appl. No. 12/780,685, dated Feb. 15, 2012.

* cited by examiner

*Primary Examiner* — Shiow-Jy Fan
(74) *Attorney, Agent, or Firm* — Marshall, Gerstein & Borun LLP

(57) ABSTRACT

A query in an imprecise syntax is received, and a plurality of assumptions relating to the meaning of the query are determined. One of the assumptions is chosen from the determined plurality of assumptions, and a first response to the query is generated based on the chosen assumption. A user interface mechanism is provided to permit a user to change the assumption on which the first response was based, and a second response to the query is generated based on the changed assumption.

15 Claims, 18 Drawing Sheets

WolframAlpha™ computational knowledge engine

100pF series capacitance

To see full output on this page you need to enable JavaScript in your browser. More info »

758

762  788

Calculate [equivalent capacitance ▼]
786
≡ capacitance 2: [20 pF]
766

770

Input information:

| series capacitance | | |
|---|---|---|
| capacitance 1 | 100 pF | (picofarads) |
| capacitance 2 | 20 pF | (picofarads) |

774
778

Result:

784

| equivalent capacitance | 16.67 pF (picofarads) |
|---|---|
| | 0.01667 nF (nanofarads) |
| | $1.667 \times 10^{-11}$ F (farads) |

Equation:

782

$$\frac{1}{C} = \frac{1}{C_1} + \frac{1}{C_2}$$

| $C$ | equivalent capacitance |
|---|---|
| $C_1$ | capacitance 1 |
| $C_2$ | capacitance 2 |

(capacitance given by two capacitors arranged in series.)

Computed by: Wolfram *Mathematica*          Download as: PDF | Live *Mathematica*

WolframAlpha computational knowledge engine

754

100pF series capacitance

To see full output on this page you need to enable JavaScript in your browser. More info »

758

762    788

Calculate [equivalent capacitance ▼]  786 capacitance 2: [10 pF]

790    792

770

Input information:

series capacitance

| | 774 |
|---|---|
| capacitance 1 | 100 pF (picofarads) |
| capacitance 2 | 20 pF (picofarads) |

778

Result:    784

| equivalent capacitance | 16.67 pF (picofarads) |
|---|---|
| | 0.01667 nF (nanofarads) |
| | $1.667 \times 10^{-11}$ F (farads) |

Equation:    782

$$\frac{1}{C} = \frac{1}{C_1} + \frac{1}{C_2}$$

| $C$ | equivalent capacitance |
|---|---|
| $C_1$ | capacitance 1 |
| $C_2$ | capacitance 2 |

(capacitance given by two capacitors arranged in series.)

Computed by: Wolfram Mathematica    Download as: PDF | Live Mathematica

Figure 14:
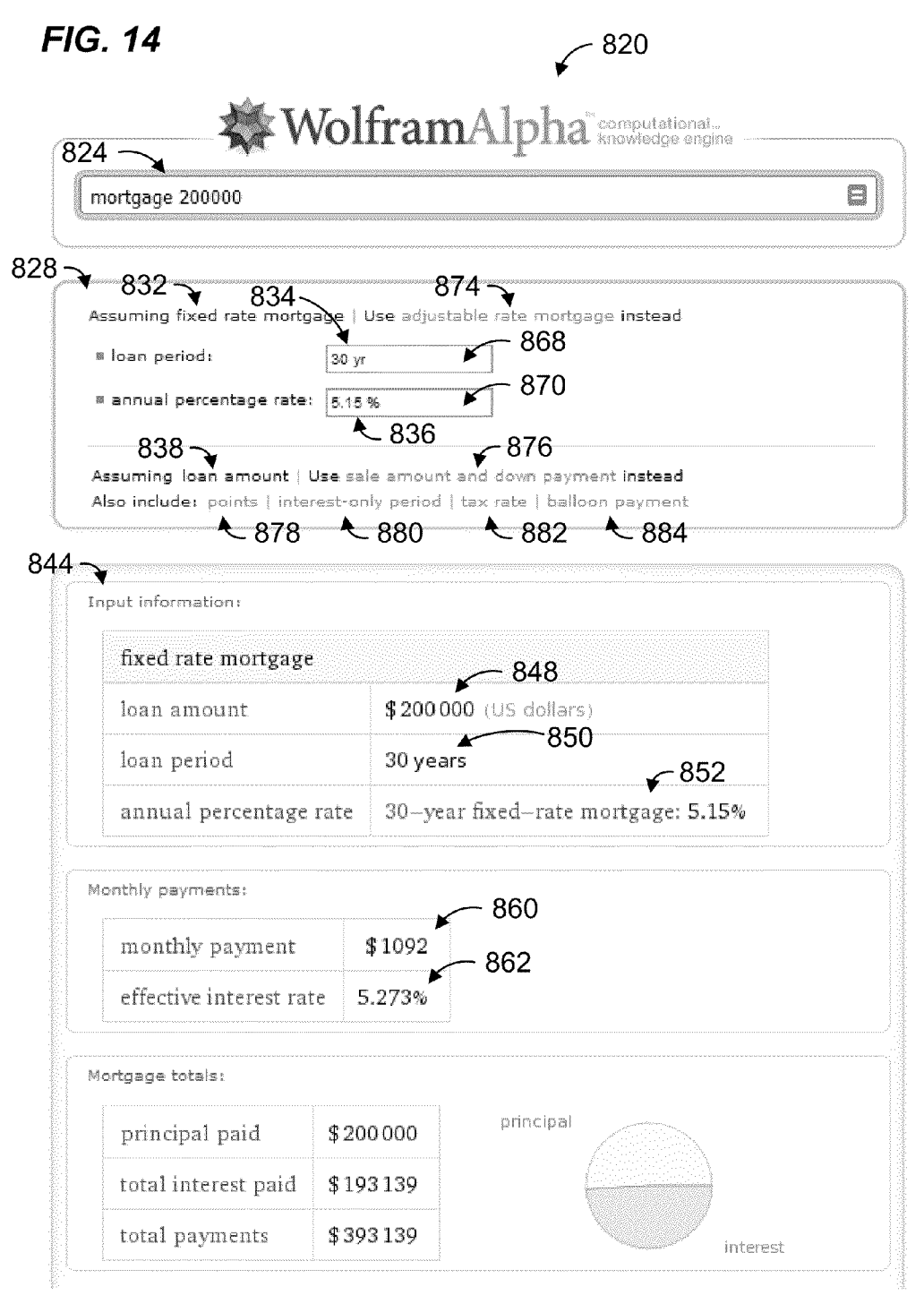

🟊 WolframAlpha™ computational knowledge engine

824 — [ mortgage 200000 ] 🔲

828 —
832 — 834 — 874 —
Assuming fixed rate mortgage | Use adjustable rate mortgage instead
— 868
■ loan period: [ 30 yr ]
— 870
■ annual percentage rate: [ 5.15 % ]
↖ 836
838 — ,— 876
Assuming loan amount | Use sale amount and down payment instead
Also include: points | interest-only period | tax rate | balloon payment
↖ 878 ↖ 880 ↖ 882 ↖ 884

844 —

Input information:

| fixed rate mortgage | |
|---|---|
| loan amount | $ 200 000 (US dollars) — 848 |
| loan period | 30 years — 850 |
| annual percentage rate | 30-year fixed-rate mortgage: 5.15% — 852 |

Monthly payments:

| | — 860 |
|---|---|
| monthly payment | $ 1092 |
| effective interest rate | 5.273% — 862 |

Mortgage totals:

| principal paid | $ 200 000 |
|---|---|
| total interest paid | $ 193 139 |
| total payments | $ 393 139 | principal interest

METHOD AND SYSTEM FOR RESPONDING TO QUERIES IN AN IMPRECISE SYNTAX

CROSS-REFERENCES TO RELATED APPLICATIONS

This application claims the benefit of U.S. Provisional Patent Application No. 61/178,853, entitled "Assumption Mechanism for Queries," which was filed on May 15, 2009, the entire disclosure of which is hereby incorporated by reference herein.

This application is also related to U.S. patent application Ser. No. 12/780,685, entitled "Assumption Mechanism for Queries," which was filed on the same date as the present application, the entire disclosure of which is hereby incorporated by reference herein.

BACKGROUND

Search engines, such as Internet search engines, have been in use for some time. Such search engines permit the user to form a search query using combinations of keywords to search through a web page database containing text indices associated with one or more distinct web pages. The search engine looks for matches between the search query and text indices in the web page database, and then returns a number of hits which correspond to URL pointers and text excerpts from the web pages that represent the closest matches.

Some Internet search engines attempt to detect when a user has entered a query incorrectly. For example, the Google™ search engine employs a "Did you mean . . . ?" feature that essentially runs a spellchecker on user queries. The spellchecker attempts to detect when an entered word is misspelled by checking it against a database of common words and their misspellings. When a possible misspelling is detected, the search engine may provide to the user a prompt to invoke an alternative query in which the misspelled word is spelled correctly.

Some search engines utilize natural language processing (NLP) techniques. Word sense disambiguation, the process of identifying which sense of a word is used in any given sentence, is a common challenge in any semantic NLP system.

Several NLP systems deal with disambiguation by consulting a comprehensive body of world knowledge. This is done through hierarchies or ontologies, as well as many simple factual statements about the world. Entities are defined in relation to other entities, and semantic maps are created which assist in disambiguating words based on the context in which those words are used. The problem with this approach is that a successful disambiguation requires gigantic ontologies and relational maps that require a huge amount of effort and time to put together. Even the most successful efforts to date have fallen short of a human-like capacity to disambiguate based on context.

BRIEF DESCRIPTION OF THE DRAWINGS

FIG. 10 is an illustration of an example display that may be utilized in an implementation of the method of FIG. 9;

FIG. 11 is another illustration of the example display of FIG. 10;

FIG. 14 is an illustration of another example display that may be utilized in an implementation of the method of FIG. 9;

SUMMARY OF THE DISCLOSURE

Figure 1:
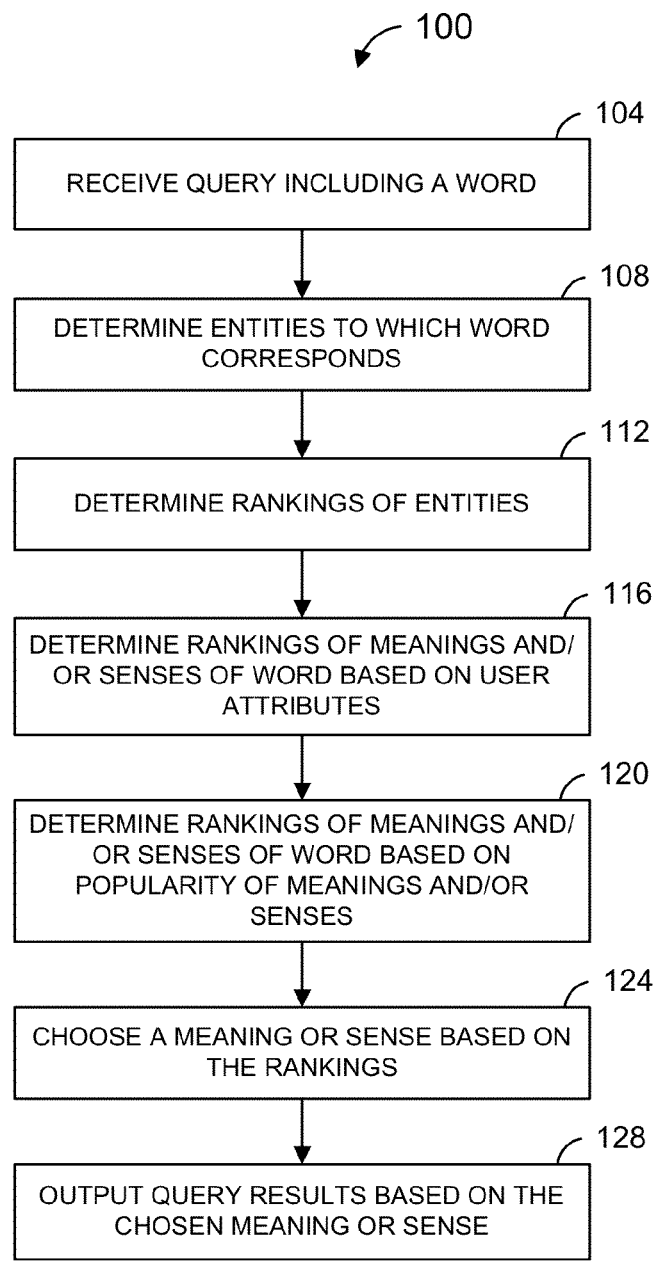
FIG. 1 is a flow diagram of an example method for generating query results when a query includes a word that has multiple meanings, has multiple senses, and/or corresponds to multiple entities.

In one embodiment, a method includes receiving a query in an imprecise syntax, and determining a plurality of assumptions relating to the meaning of the query. The method also includes choosing one of the assumptions from the determined plurality of assumptions, and generating a first response to the query based on the chosen assumption. Additionally, the method includes providing a user interface mechanism to permit a user to change the assumption on which the first response was based, and generating a second response to the query based on the changed assumption.

In another embodiment, a tangible storage medium having stored thereon machine executable instructions is provided. The machine executable instructions, when executed by one or machines, are for receiving a query in an imprecise syntax, and determining a plurality of assumptions relating to the meaning of the query. Additionally, the machine executable instructions, when executed by one or machines, are for choosing one of the assumptions from the determined plurality of assumptions, and generating a first response to the query based on the chosen assumption. Also, the machine executable instructions, when executed by one or machines, are for providing a user interface mechanism to permit a user to change the assumption on which the first response was based. Further, the machine executable instructions, when executed by one or machines, are for generating a second response to the query based on the changed assumption.

In yet another embodiment, a method includes transmitting, via a network, a query in an imprecise syntax, and receiving, via the network, query results that are based on an assumption chosen from a plurality of assumptions relating to the meaning of the query. Also, the method includes receiving, via the network, an indication of the chosen assumption, and receiving, via the network, a user interface mechanism to permit selection of another assumption from the plurality of assumptions. The method additionally includes displaying the query results, the indication of the chosen assumption, and the user interface mechanism to permit selection of another assumption from the plurality of assumptions on a display device.

In still another embodiment, a tangible storage medium having stored thereon machine executable instructions is provided. The machine executable instructions, when executed by one or machines, are for causing a query in an imprecise syntax to be transmitted via a network, and receiving, via the network, query results that are based on an assumption chosen from a plurality of assumptions relating to the meaning of the query in response to the query. Additionally, the machine executable instructions, when executed by one or machines, are for receiving, via the network, an indication of the chosen assumption in response to the query, and receiving, via the network, a user interface mechanism to permit selection of another assumption from the plurality of assumptions. Also, the machine executable instructions, when executed by one or machines, are for causing the query results, the indication of the chosen assumption, and the user interface mechanism to permit selection of another assumption from the plurality of assumptions to be displayed on a display device.

DETAILED DESCRIPTION

Embodiments described herein generally relate to determining a word sense in response to an actual user query in a system designed for computation, search, or other activities involving the processing of queries. Assumptions, which are attempts to disambiguate pieces of the user's query string, are generated. Generation of the assumptions is based on various heuristics and algorithms which are designed to disambiguate words which may connote multiple different entities or senses given the context. Assumptions also may be ranked based on a set of criteria that does not require an elaborately constructed body of world knowledge to be created. A most likely assumption may be chosen for generating a machine-generated query or for retrieving query results. Indications of other generated assumptions may be sent to or displayed to a user. The indications of other generated assumptions may be ranked. If displayed, the indications of other generated assumptions may include links that, when selected, cause a new machine-made query to be submitted and/or that cause query results generated based on the selected assumption to be provided to the user.

Embodiments described herein may be utilized in a system for parsing queries from users and generating answer outputs. In such a system, there may be instances in which a submitted query includes a word that has multiple senses and/or may refer to multiple entities. In such a situation, a plurality of assumptions for the word may be made, and one of the assumptions may be utilized to generate a machine-made query and/or to return results for the user query.

FIG. 1 is a flow diagram of an example method 100 for generating query results when a query includes a word that has multiple meanings, has multiple senses, and/or corresponds to multiple entities. The method 100 thus may be utilized in a in a system designed for computation, search, or other activities involving the processing of queries.

The method 100 could be implemented, at least partially, by a server system in conjunction with a website, for example. In this context, a user could access the website using a browser running on a personal computer, cell phone, personal digital assistant (PDA), etc., for example, and could utilize the website to obtain information. It will be understood, however, that the method 100 could also be used in other contexts.

For example, the method 100 could be implemented, at least partially, as part of a "Help" system or other query-based system of a software application such as a computational tool. In such a context, the user could use the query-based system to obtain information.

At block 104, a query is received, such as a query provided by a user. For example, the query may be received via website, via a computational tool, via a software application executed on a computer, etc. The query may include a word that has multiple meanings, has multiple senses, and/or corresponds to multiple entities. In one embodiment, the query is a query in an imprecise syntax. A query in an imprecise syntax is in contrast to a typical computer programming language or database query syntax, in which exact spelling, exact placement of punctuation, exact placement of parentheses, etc., is necessary to specify a particular query or statement. Similarly, with typical computer programming language or database query syntax, a slight change in punctuation, for example, could specify a completely different query or statement, or could render a computer language or database query statement meaningless to a compiler or database. On the other hand, with a query in an imprecise syntax, the query can be expressed using language and terms that may be readily understandable to a human, but unintelligible to a computer program such as a compiler or database interface. Additionally, with a query in an imprecise syntax, many different variations of language and terms and groupings of language and terms may correspond to one query. Further, terms and groupings of terms in the query may be ambiguous, i.e., can have multiple meanings or senses.

At block 108, entities that correspond to the word may be determined. For example, an entities database may be queried with the word. The entities database may include categorized entities such as geographical entities, people, companies, etc. The entities database optionally may include attributes of the entities. Query results from the entities database may include an entity as well as an indication of a category to which the entity belongs. Optionally, the query results from the entities database may include attributes corresponding to the entity.

At block 112, rankings of the entities determined at block 108 may be determined based on attributes of the entities. In one embodiment, entities in a same category will have a common set of attributes, and different categories may have different sets of attributes. For example, one category may be cities, and example attributes for the cities category may include one or more of population, area, etc. Another example of a category may be movies, and example attributes for the movies category may include one or more of box office gross, how recently it was released, etc. Yet another example of a category may be universities, and example attributes for the universities category may include one or more of enrollment numbers, a rank number in a well known published survey, etc.

Rankings may be determined based on these attributes. For example the word "Manhattan" may refer, among other things, to either "Manhattan, New York" or "Manhattan, Ill." Manhattan, N.Y. will be ranked higher than Manhattan, Ill. with respect to the attribute population. In this way, like entities may be compared based on common criteria, and one will rank higher than the other. The attributes utilized to determine the rankings at block 112 may be retrieved from the entities database or from some other database, for example.

At block 116, rankings of meanings and/or senses of the word may be determined based on user attributes. At least some of the meanings/senses may correspond to the entities determined at block 108. The attributes of the user may be determined in a variety of ways. In a website implementation, user information may be obtained from observing user browsing activity, cookies, etc., while the user interacts with the website. It may be gathered and used on the fly, rather than pre-generated. Such information may include an indication of the user's geographical location, or GeoIP location. The GeoIP location, in turn, yields information such as the time zone the user is in, the currency of the user's country, and the dominant language spoken in the user's area. The user's location may be used to judge distances or likelihoods that entities will be familiar or foreign to that user. For example, the term "Independence Day" in a user's query may refer to any of a hundred Independence Days throughout the world. But rankings of the different Independence Days may be generated based on the user's geographical location. For example, if the user is located in the United States, the sense of "Independence Day" referring to July 4 may be ranked high.

Continuing with this example, if the user's country does not have an Independence Day, then another country that does may be logically linked to or associated with the user's country. For instance, San Marino does not have an Independence Day, but it is a landlocked enclave which is completely surrounded by Italy, which does have an Independence Day. Such hard-coded relationships between entities also may be used to further disambiguate words.

Disambiguating certain formatting conventions of queries, such as the preferred date format, can depend on the user's GeoIP location as well. While Europe uses a day/month format, the United States uses a month/day format. The user's location may thus provide information so that one date format may be ranked higher than another.

In one embodiment, customized user attribute information may be used. If the user chooses different entities than the default assumption, then a profile may develop linking the user to those choices. By this method, the system can learn and remember which specific assumptions to make to a particular user. In another embodiment, a user may voluntarily supply attributes in response to prompts, for example. For example, may choose to maintain a profile with a website.

At block 120, rankings of meanings and/or senses of the word may be determined based on popularities of the different meanings and/or senses. In one embodiment, levels of popularity may be indicated by an index, which may be referred to as a "fame index." The fame index generally may be a measure of how famous or popular an entity is, and the fame index may be generated in a variety of ways. For example, the fame index may be generated based on a number of semantically-rich references to the entity in an information repository, such as an online encyclopedia. The number of links to an encyclopedic entry may be a factor in determining a fame index for an entity corresponding to the encyclopedic entry. An online encyclopedia may contain semantic examples of entities that provide definition and context. Search engines, in comparison, often may not contain useful semantic data about entities. Searching for the physicist Einstein using a typical search engine, for example, will return many results, but some may be referring to another Einstein, or a company with Einstein in the name. Looking at links to an online encyclopedia, or another source of semantic data, may increase chances that an assumption regarding the meaning or sense of a word is correct.

Other techniques may be utilized to generate the fame index. For example, the fame index may be generated based on monitoring aggregate user activity on system that provides search and/or query services, such as a website. The fame index may be based on information such as how often the entity is searched, how often web pages referring to the entity are selected from search results, etc.

In one embodiment, popularities of the entities, different meanings and/or senses of words (e.g., the fame index) may be pre-generated and stored in a database. In this embodiment, the popularities optionally may be updated over time. In another embodiment, popularities of the different meanings and/or senses of words (e.g., the fame index) may be determined in response to a user query, for example.

At block 124, one of the possible meanings or senses of the word may be chosen based on the rankings generated at blocks 112, 116, 120. For example, a formula may be applied to the rankings for all of the possible meanings and/or senses to generate an overall ranking of the possible meanings and/or senses. Then, the top-ranked meaning/sense may be chosen. At least some of the meanings/senses may correspond to the entities determined at block 108.

At block 128, query results may be returned corresponding to the query received at block 104 and utilizing the meaning/sense chosen at block 124. Block 128 may comprise generating a new query that is based on the query received at block 104 and utilizing the meaning/sense chosen at block 124. The new query may be presented to a user, for example, so the user can select the query to cause the query to be submitted to the query-based system. Alternatively, the new query may be submitted without requiring user action.

The query results may be presented in a web page, a window, etc. In an embodiment in which the query is a query in an imprecise syntax, the query results reflect an attempt to provide an answer to the query. As used herein, an "answer" to a query is a reply that is based on a chosen meaning of the query that is chosen from a plurality of determined possible meanings. The answer provides information that is relevant to the chosen meaning of the query. This is in contrast to a typical web search engine that merely returns links to web pages that the engine has found to include terms from the query. A typical web search engine does not choose a meaning of a query from a plurality of determined possible meanings.

The answer may also include information that is related to the answer. For example, if the query is "population of Manhattan", the query results may include the population of Manhattan, N.Y., the population of the metropolitan area that includes Manhattan, N.Y., a map showing the location of Manhattan, N.Y. within a region that includes Manhattan, N.Y., and other information about Manhattan, N.Y. As another example, if the query is asking for a mathematical formula, the query results may include the formula and mathematical information related to the formula such as a plot of the formula, a derivative of the formula, etc.

In some embodiments, the web page or window, for example, may also include indications of other possible meanings/senses for the word. In these embodiments, the indications of other possible meanings/senses for the word may be listed in an order, such as according to an overall ranking.

There may be cases in which only one interpretation makes sense. Therefore, in one embodiment, a "minimal questioning" or a de-clashing approach may be utilized to ensure that rankings for possible meanings/senses are not computed when they are not needed.

One instance where this de-clashing approach may be applied is when making assumptions about which date format to use (day/month or month/day). If the user inputs "11/13/08" as part of his query, only one date format interpretation makes sense, since there is no thirteenth month. Therefore, the system may automatically assume a month/day format instead of using more complex methods of generating the assumption based on GeoIP.

Figure 2:
FIG. 2 is an illustration of an example display that may be utilized in an implementation of the method of FIG. 1.
Figure 3:
FIG. 3 is another illustration of the example display of FIG. 1.

FIG. 2 is an illustration of an example display 200 that may be utilized in an implementation of a method such as the method 100 of FIG. 1. The example display 200 is configured to permit a user to enter a query, such as a query in an imprecise syntax. The display 200 may be part of a web page, window, etc., for example. In FIG. 2, a query has been entered: "Manhattan." The query has been entered into a text box 204 by a user. In response, an assumption as to the meaning/sense of Manhattan has been generated. In particular, it is assumed that Manhattan is a city, and that the city is in the state of New York. Thus, the assumed meaning/sense of "Manhattan" is the city of Manhattan located in New York State. The assumption is displayed in a portion 208 of the display 200. The display 200 also includes query results corresponding to the assumption. The query results are displayed in a portion 212 of the display 200. The display 200 also includes user interface mechanisms such as links and pull down menus to permit the user to change the assumption. For example, there are links 216 to permit the user to change the assumed entity from a city to an island, bridge, periodical, or movie. There is a link 220 to change the assumed entity from Manhattan, N.Y. to Manhattan, Kans. Additionally, there is a pull-down menu user interface mechanism 224 to permit a user to change the assumed entity to one of a plurality of other cities. FIG. 3 is an illustration of the display 200 in which a pull down menu 228 has been activated using the user interface mechanism 224 to see other possible meanings/senses of "Manhattan", assuming the entity is a city.

Figure 4:
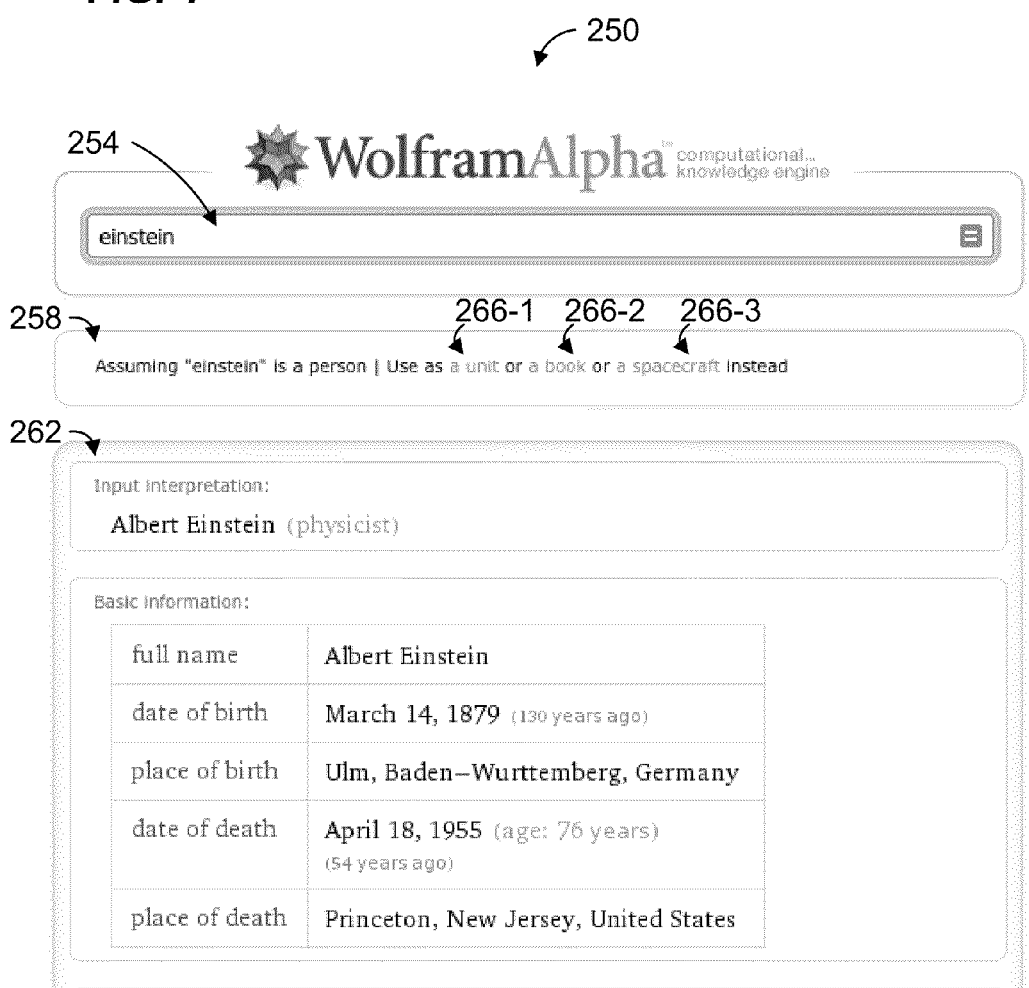
FIG. 4 is an illustration of another example display that may be utilized in an implementation of the method of FIG. 1.

FIG. 4 is an illustration of an example display 250 that may be utilized in an implementation of a method such as the method 100 of FIG. 1. The example display 250 is configured to permit a user to enter a query, such as a query in an imprecise syntax. The display 250 may be part of a web page, window, etc., for example. In FIG. 4, a query has been entered: "einstein." The query has been entered into a text box 254 by a user. In response, an assumption as to the meaning/ sense of "einstein" has been generated. In particular, it is assumed that "einstein" is a person, and the assumed meaning/sense of "einstein" is the physicist Albert Einstein. The assumption is displayed in a portion 258 of the display 250. The display 250 also includes query results corresponding to the assumption. The query results are displayed in a portion 262 of the display 250. The display 250 also includes user interface mechanisms such as links to permit the user to change the assumption. For example, there are links 266 to permit the user to change the assumed entity from a person to a unit of measurement, a book, or a spacecraft.

Figure 5:
FIG. 5 is an illustration of another example display that may be utilized in an implementation of the method of FIG. 1.

FIG. 5 is an illustration of an example display 300 that may be utilized in an implementation of a method such as the method 100 of FIG. 1. The example display 300 is configured to permit a user to enter a query, such as a query in an imprecise syntax. The display 300 may be part of a web page, window, etc., for example. In FIG. 5, a query has been entered: "13/11/08." The query has been entered into a text box 304 by a user. In response, an assumption as to the meaning/sense of "13/11/08" has been generated. In particular, it is assumed that "13/11/08" is a date and the assumed meaning/sense of "13/11/08" is Nov. 13, 2008. The assumption is displayed in a portion 308 of the display 300. The display 300 also includes query results corresponding to the assumption. The query results are displayed in a portion 312 of the display 300. The display 300 also includes user interface mechanisms such as links to permit the user to change the assumption. For example, there is a link 316 to permit the user to change the assumed entity from a date to a mathematical object.

Figure 6:
FIG. 6 is an illustration of another example display that may be utilized in an implementation of the method of FIG. 1.

FIG. 6 is an illustration of an example display 350 that may be utilized in an implementation of a method such as the method 100 of FIG. 1. The example display 350 is configured to permit a user to enter a query, such as a query in an imprecise syntax. The display 350 may be part of a web page, window, etc., for example. In FIG. 6, a query has been entered: "springfield." The query has been entered into a text box 354 by a user. In response, an assumption as to the meaning/sense of "Springfield" has been generated. In particular, it is assumed that "Springfield" is a city, and the assumed meaning/sense of "springfield" is the Springfield, Ill. The assumption is displayed in a portion 358 of the display 350. The display 350 also includes query results corresponding to the assumption. The query results are displayed in a portion 362 of the display 350. The display 350 also includes user interface mechanisms such as links and a pull down menu to permit the user to change the assumption. For example, a user interface mechanism 370 permits a user to display a pull down menu 374 that lists other cities so that the user can change the assumed city.

In one embodiment, the method 100 may be incorporated into a system such as the example systems described U.S. patent application Ser. No. 11/852,044, filed on Sep. 7, 2007, and entitled "Methods and Systems for Determining and Processing Formulas," which is hereby expressly incorporated by reference herein. A module or modules for choosing a meaning/sense of a word may be added to the system or incorporated into one of the blocks illustrated in FIG. 11 of U.S. patent application Ser. No. 11/852,044.

Figure 7:
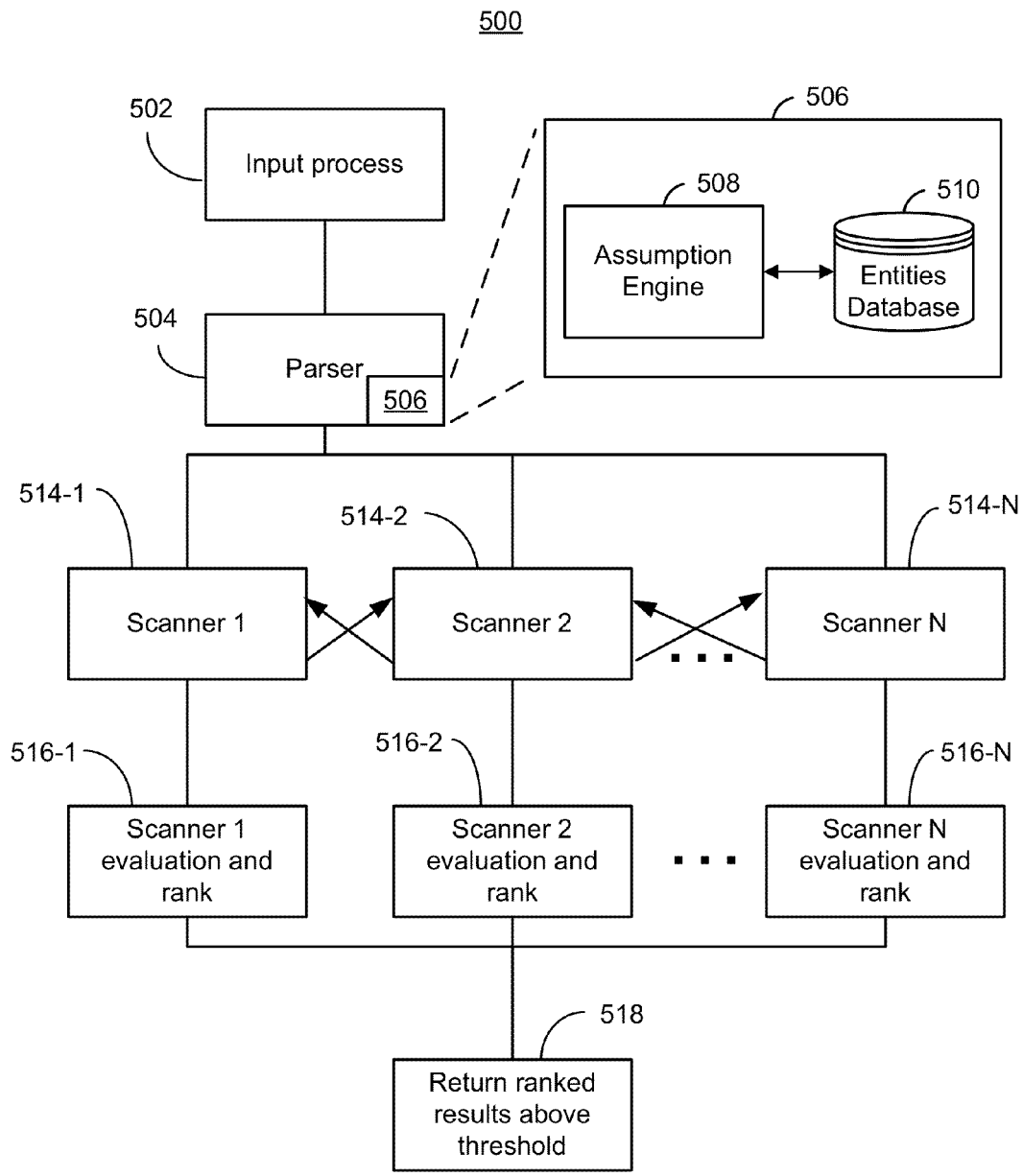
FIG. 7 is a block diagram of an example system for answering queries in an imprecise syntax.

Referring now to FIG. 7 of the present application, a block diagram illustrates an example system 500 that may be used to implement one or more of the example methods described previously. Of course other systems may also be used to implement those methods. The system 500 may be a standalone executable application with its own user interface. Also, the system 500 could be an added feature or subsystem of a larger application such as a computational application (e.g., the MATHEMATICA® software system available from Wolfram Research, Inc., a spreadsheet application, etc.). For example, the system 500 could be part of a "help" subsystem within a larger application. Additionally, the system 500 could be an applet accessed via a website, for example. Further, the system 500 may also be implemented as a Web service with a Web browser implementing the user interface in a known manner. For example, the system 500 could be browser plug-in or toolbar system. The system 500 may include an input process 502 for receiving data from a user. The input process 502 may receive input in an imprecise syntax. The input process 502 may also provide elementary error and consistency checking, for example, to help ensure that at least some characters are present or prompting the user with an error when a length limit is exceeded.

The system 500 may also include a parser 504 communicatively coupled to the input process 502. The parser 504 may examine the input to extract keywords, group words into phrases, identify numerical expressions, categorize data, etc., for example. The parser 504 may perform an initial go/no go analysis on the keywords, phrases, or numerical expressions to determine if there is enough information to proceed to a further step. When there is not enough information to make even a cursory pass at further analysis, the parser 504 may cause the user to be prompted for additional information such as information that may clarify the formula desired by the user. Alternatively, the system 500 may return the input unchanged along with a message that it cannot interpret the input.

In one implementation, the parser 504 may take an initial input and create tokens, and then assemble the tokens into one or more expressions in a precise syntax. In other words, the parser 504 may generally take input data in an imprecise syntax and generate expressions in a precise syntax. As an example, if a user enters the text "sin [x]<0.5", the parser 504 may create a plurality of tokens: "sin", "[x]", "<", and "0.5", where "sin" is recognized as a function name, "[x]" is recognized as a variable name, "<" is recognized as an inequality, and "0.5" is recognized as a real number. Then, the parser 504 may generate an expression in a precise syntax using these tokens.

Optionally, the parser 504 may perform additional processing. For example, the parser may attempt to identify phrases. Additionally, the parser 504 may attempt to rearrange tokens to see if the rearrangements match something that the parser 504 understands, such as a phrase. For instance, the parser 504 may utilize algorithmic rearrangements of the input. Also, the parser 504 may cause the user to be prompted to rephrase the input. Then, the parser 504 may analyze the original input in conjunction with the rephrased input. Further, the parser 504 may utilize machine learning techniques to identify language processing algorithms that work better than others.

In one embodiment, the parser 504 includes an assumption system 506. The assumption system 506 includes an assumption engine 508 and includes or is coupled to an entities database 510. In an embodiment, the assumption system 506 implements blocks 108, 112, 116, 120, and 124 of FIG. 1. In other embodiments, the assumption system 506 implements one or more blocks similar to one or more of the blocks 108, 112, 116, 120, 124 and/or omits one or more of blocks 108, 112, 116, 120. In still other embodiments, the assumption system 506 implements another suitable method for determining assumptions to be made about words, phrases, groups of textual characters, etc.

In one embodiment, the assumption system 506 provides an indication of an assumption for each word or phrase that the assumption system 506 recognizes. In an embodiment, the assumption system 506 is able to recognize words and phrases that are stored in the entities database 510. For example, the assumption engine 508 may search for words, phrases, groups of textual characters, etc., that are stored in the entities database 510 and correspond to entities known by the system 500. The entities database 510, in an embodiment, is a structured database storing entities organized into categories, sub-categories, etc. In one embodiment, the entities database 510 stores attributes of entities. For example, an entity "hamburger" may be a subcategory of "Food". A "hamburger" may have attributes such as size (large patty, regular patty, small patty), patty count (one, two, etc.), variety (plain, with condiments, etc.). In some embodiments, an entity can belong to multiple categories, sub-categories, etc. For example, a hamburger could be categorized as "Food" and also categorized as "Fast Food", which is a sub-category of Food.

The indication of the assumption may be a keyword. As an example, the word "pi" can refer to different things, like the name of the well-known mathematical constant (π) or the name of the movie "pi". If the assumption system 506 makes the assumption that the word "pi" is referring the mathematical constant, the indication of the assumption may be the keyword "NamedConstant" or some other suitable keyword. If the assumption system 506 makes the assumption that the word "pi" is referring the movie, the indication of the assumption may be the keyword "Movie" or some other suitable keyword.

The indication of an assumption for a word, a phrase, a group of textual characters, etc., is associated with the word, the phrase, the group of textual characters, etc., so that the system 500 can determine to which word, phrase, group of textual characters, etc., the assumption applies. The indication is associated with the word, the phrase, the group of textual characters, etc., using a precise syntax known to the system 500.

As another example, the letter "m", standing alone or in combination with other characters such as "I" may refer to units of meters or minutes. If the assumption system 506 makes the assumption that "m" is referring to units of meters, the indication of the assumption may be the keywords "Unit" and "Meters" or some other suitable keywords. The keywords "Unit" and "Meters" may be associated to indicate that "Meters" is a subtype of "Units". If the assumption system 506 makes the assumption that "m" is referring units of minutes, the indication of the assumption may be the keyword. "Unit" and "Minutes" or some other suitable keywords. The keywords "Unit" and "Minutes" may be associated to indicate that "Minutes" is a subtype of "Units".

As another example, the word "integrate" may refer to the word that means to unite or it may refer to the mathematical integral function. If the assumption system 506 makes the assumption that "integrate" is referring to the mathematical function, the indication of the assumption may be the keyword "Function" or some other suitable keyword.

As another example, the word "hamburger" may refer to the food hamburger, or more specifically to a hamburger from McDonald's®, a hamburger from Burger King®, etc. If the assumption system 506 makes the assumption that "hamburger" is referring to the basic hamburger, the indication of the assumption may be the keywords "Food" and "Hamburger" or some other suitable keywords. The keywords "Food" and "Hamburger" may be associated to indicate that "Hamburger" is a subtype of "Food". If the assumption system 506 makes the assumption that "hamburger" is referring to a hamburger from McDonald's®, the indication of the assumption may be the keywords "Food" and "McDonaldsHamburger" or some other suitable keywords. The keywords "Food" and "McDonaldsHamburger" may be associated to indicate that "McDonaldsHamburger" is a subtype of "Food". If the assumption system 506 makes the assumption that "hamburger" is referring to a hamburger from Burger King®, the indication of the assumption may be the keywords "Food" and "BurgerKingHamburger" or some other suitable keywords. The keywords "Food" and "BurgerKingHamburger" may be associated to indicate that "BurgerKingHamburger" is a subtype of "Food".

As another example, the input "3:00" may refer to either an AM time or a PM time. If the assumption system 506 makes the assumption that "3:00" is referring to an AM time, the indication of the assumption may be the keyword "am" or some other suitable keyword. Similarly, if the assumption system 506 makes the assumption that "3:00" is referring to a PM time, the indication of the assumption may be the keyword "pm" or some other suitable keyword.

As another example, the input "12/11/1996" may refer to either Dec. 11, 1996 or Nov. 12, 1996. In other words, the format may be month/day/year or day/month/year. If the assumption system 506 makes the assumption that the format is month/day/year, the indication of the assumption may be the keyword "MonthDayYear" or some other suitable keyword. Similarly, if the assumption system 506 makes the assumption that the format is day/month/year, the indication of the assumption may be the keyword "DayMonthYear" or some other suitable keyword.

As another example, with a query that contains elements separated by spaces, it may be ambiguous whether the input is to be interpreted as a multiplication of elements or a list of elements. For example, the query "3 x" could be interpreted as 3*x, but it could also be the list {3, x}. If the assumption system 506 makes the assumption that elements separated by a space or spaces is a multiplication of the elements, the indication of the assumption may be the keyword "Times" or some other suitable keyword. Similarly, if the assumption system 506 makes the assumption that elements separated by a space or spaces is a list of elements, the indication of the assumption may be the keyword "List" or some other suitable keyword.

As another example, with a query that contains elements separated by a comma, it may be ambiguous whether the input is to be interpreted as a number with a comma for a thousands separator or a list of elements. For example, the query "1,234" could be interpreted as the number one thousand two hundred and thirty four, but it could also be the list {1, 234}. If the assumption system 506 makes the assumption that two elements separated by a comma is a number, the indication of the assumption may be the keyword "Number" or some other suitable keyword. Similarly, if the assumption system 506 makes the assumption that elements separated by a comma is a list of elements, the indication of the assumption may be the keyword "List" or some other suitable keyword.

As another example, with a query that contains a number having only zeros and ones, it may be ambiguous whether the input is to be interpreted as a binary number or a base 10 number. For example, the query "100110101" could be interpreted as a binary number or a base 10 number. If the assumption system 506 makes the assumption that the number is a binary number, the indication of the assumption may be the keyword "Binary" or some other suitable keyword. Similarly, if the assumption system 506 makes the assumption that the number is a base 10 number, the indication of the assumption may be the keyword "Decimal" or some other suitable keyword.

As another example, with a query that contains a series of letters, it may be ambiguous whether the input is referring to a DNA sequence. For example, the query "AGGGAAAA" could be interpreted as a DNA sequence. If the assumption system 506 makes the assumption that an input is a DNA sequence, the indication of the assumption may be the keyword "DNA" or some other suitable keyword.

As yet another example, with a query that contains a word, phrase, or group of textual characters relating to a formula, it may be ambiguous as to whether the query is referring to the formula or some other entity, to which of various versions of the formula it relates, for what parameter of the formula to solve, what are the values of other parameters in the formula, etc.

As an example of ambiguity regarding whether the phrase, or group of textual characters relates to a formula, if the query includes the word "mortgage", this may refer to a current mortgage rate, a formula for calculating a monthly mortgage payment, a formula for calculating an effective interest rate of a mortgage, etc. If the assumption system 506 makes the assumption that "mortgage" is referring to a formula, the indication of the assumption may be the keyword "Formula" or some other suitable keyword.

If it is ambiguous as which of several formulas a query corresponds, the assumption system 506 may make an assumption as to one of the formulas. For example, with the query including the word "mortgage", there may be multiple formulas associated with the word "mortgage" such as a formula for calculating a monthly mortgage payment for a fixed-rate mortgage, a formula for calculating a monthly mortgage payment for a variable-rate mortgage, a formula for calculating an effective interest rate of a fixed-rate mortgage, etc. When the assumption system 506 makes an assumption as to one of several different formulas, the chosen formula may be indicated by a suitable keyword.

With a query relating to a formula, it may be ambiguous regarding the parameter for which the formula is to be solved. For example, with a formula for Doppler shift that relates a frequency reduction factor, a speed of a sound source away from an observer, and a sound speed, it may be ambiguous whether the user wishes to solve for the frequency reduction factor, the speed of the sound source away from the observer, or the sound speed. When the assumption system 506 makes an assumption as to one of several parameters for which to solve, the chosen parameter for which to solve may be indicated by a suitable keyword.

With a query relating to a formula, it may be ambiguous regarding whether numbers or values in the query correspond to values of parameters in the formula. For example, with the query including the words "mortgage" and "2000", it may be ambiguous if "2000" is a dollar amount of a monthly payment, a year (e.g., the year 2000), a loan amount, a dollar amount corresponding to points, etc. Additionally, the query may not provide information regarding one or more parameter values required to solve the formula. Thus, the assumption system 506 may make assumptions regarding the values of these parameters. For example, if the query is assumed to request a calculation of a monthly mortgage payment but does not specify an interest rate, the assumption system 506 may retrieve a default mortgage rate value from a database such as the entities database 510 or another database. When the assumption system 506 makes an assumption regarding the value of a parameter of a formula, the assumed value may be indicated by a suitable keyword.

One or more indicators of one or more assumptions made by the assumption system 506 may be included in one or more expression in a precise syntax generated by the parser 504. For example, if keywords are utilized for indicating assumptions, an expression generated by the parser 504 may include the keywords, and the keywords are associated with respective words, phrases, groups of textual characters, etc., to indicate to which words, phrases, groups of textual characters, etc., the assumptions correspond.

In an embodiment, the assumption system 506 also generates indicators of one or more additional assumptions that can be made about a word, phrase, group of textual characters, a formula, a parameter value, etc. These indicators may be used by the system 500 to permit a user to change assumptions made by the system 500.

The one or more expressions generated by the parser 504 may be provided to one or more scanners 514 that may each have a particular focus. For example, scanner 514-1 may be directed to developing a graphical plot for numerical expressions or phrases parsed from the input that can be reduced to a plot. As an example, if an input includes an expression, such as $x^2$, scanner 514-1 may develop and output a plot of $x^2$ (i.e., a parabola). As another example, if the expression is Sin [x]<0.5, scanner 514-1 may develop and output a plot of values of x that satisfy this expression. Other scanners 514 may have other specific specializations, such as evaluating equations, determining roots, evaluating integrals, evaluating derivatives, determining relevant transforms, etc. Other specializations may include, for example, determining mathematical formulas, determining chemical formulas, determining physics formulas, determining financial formulas, determining engineering formulas, determining medical formulas, etc.

With regard to formulas, the parser 504 may provide to one or more scanners 514 an expression in a precise syntax that specifies one or more of an assumed formula, an assumed parameter for which to solve, and assumed values of other parameters in the formula.

Depending upon the application, more or less scanners 514 may be utilized. For instance, if an application is to be devoted for use in a financial field, scanners related to chemical formulas may be omitted.

Some scanners 514 may generate results based on a database query. For example, a scanner 514 related to geometry formulas may query a database (such as the entities database 510 or another database) for a known formula. As another example, a scanner 514 may query a database (such as the entities database 510 or another database) for raw data needed to evaluate an expression. For instance, an expression may include c, the speed of light, and a scanner may query a database to retrieve a numerical value for c. As another example, an expression may require statistical data, such as a population of a particular city, state, or country needed to evaluate a "per capita" expression, and the scanner 514 may query a database (such as the entities database 510 or another database) to obtain the needed data.

Other scanners 514 may generate results by synthesizing outputs. For example, a scanner 514 for generating indefinite integrals may receive a mathematical expression and synthesize the indefinite integral of that expression, rather than searching a database of pre-generated indefinite integrals. Some scanners 514 may be capable of doing database queries as well as synthesis of results. For example, the scanner 514 related to geometry formulas may generate an expression for the area of a triangle based on a database query, but may also synthesize another expression by integrating parameter values into formulas retrieved from a database.

In addition to receiving data from the parser 504, each scanner 514 may share results with each of the other scanners. Again, results generated by a scanner 514 based on the shared results may also be shared with each of the other scanners 514, and so on. This process may continue until the scanners 514 no longer have additional data to add, for example. Trivial transforms may also be recognized and blocked.

For each assumption made by the assumption system 506, the parser 504 provides information to the scanners 514 that indicates the assumption. For example, the parser 504 may provide keywords or other indicators of the assumptions made. The scanners 514 use the assumption information (e.g., keywords) in generating results. Additionally, the scanners 514 may obtain and utilize additional information related to the assumption using the assumption. For example, if it is assumed that the word "pi" refers to the movie, the scanners 514 can obtain and utilize other information related to the movie "pi" such as the year of its release, the name of the director, the box office receipts.

The additional information related to the assumption may be stored in the entities database 510 or another database. In one embodiment, the entities database 510, or another database, stores attributes of entities stored in the entities database 510. The stored attributes of entities may provide additional information that can be utilized by the scanners 514. As an example, the entities database 510, or another database, stores movie entities and attributes of movies such as the year of release, the name of the director, the names of actors, the box office receipts, etc.

When each scanner 514 has contributed to both the original input from the parser 504 and shared input from all the other scanners 514, the results from each scanner to respective postprocessors 516. The postprocessors 516 evaluate the results and may provide a ranking of each result by assigning a value (e.g., a percentage) to each result.

The ranked results may be passed to an output module 518 which may generate an output having the results with rankings above a certain threshold, while omitting results below the threshold. The threshold may be set at a predetermined level, or may be adjusted according to the number of results and a statistical analysis of the rankings. For example, a query that produces ten thousand results may adjust the threshold to 99% relevance, thereby limiting the displayed results to the top 100. In another example though, where perhaps only a half a dozen results are returned, all the results may be displayed even though the rankings may be relatively low. The output of the output module 518 may comprise a web page, a window, etc. Examples of web pages, windows, etc., that the output module 518 may generate are shown in FIGS. 2-6.

In an embodiment, the output module 518 receives indicators of one or more additional assumptions that can be made about a word, phrase, group of textual characters, etc., from the assumption system 506. The output module 518 may utilize these indicators to provide information relating to the other assumptions that can be made and to provide user interface mechanisms that permit a user to change assumptions made by the system 500 in order to generate at least potentially different results. Referring to FIGS. 2-6, links, pull-down menus, etc., can be provided to permit a user to change assumptions made by the system 500 in order to generate at least potentially different results.

Figure 8:
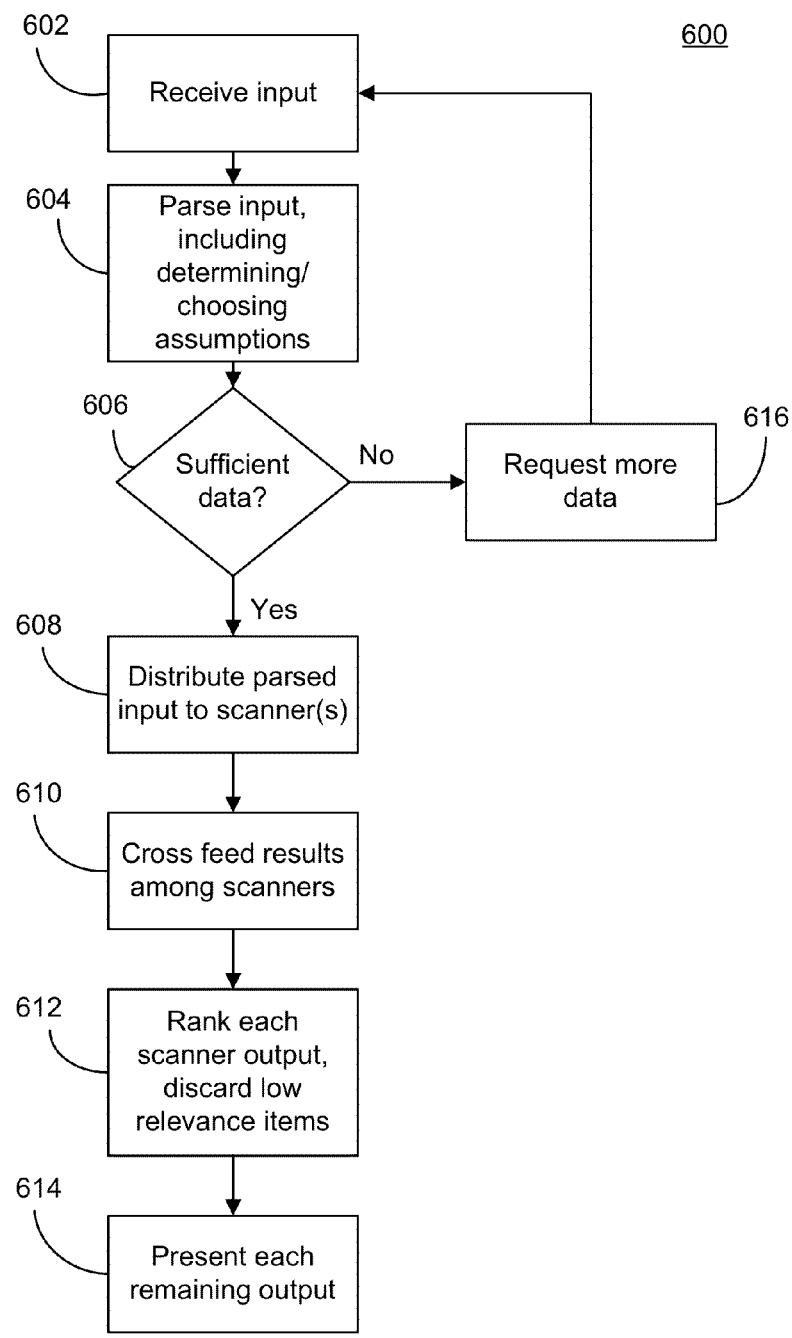
FIG. 8 is a block diagram of an example method of answering queries in an imprecise syntax.

FIG. 8 is flow diagram of an example method 600 for providing one or more answers to a user based on a query input that may be in an imprecise syntax. The method 600 will be described with reference to FIG. 7 for ease of explanation. It will be understood, however, that the method 600 may be utilized with systems other than the system 500, and that the system 500 may implement methods other than the method 600.

Input in an imprecise syntax may be received at block 602 and then parsed at block 604 to process the input. For example, the input may be analyzed to create data in a formal or precise syntax. Parsing at block 604 may include determining and choosing assumptions such as described above. When the parser 504 is able to determine a sufficient amount of data to proceed, a 'yes' branch from a block 606 maybe taken to a block 608. At the block 608, the parsed data (e.g., the output of the parser 504) may be distributed to each of the plurality of scanners 514. As described above, the parsed data may include information that indicates assumptions made regarding words and/or phrases in the parsed data. Also as described above, each scanner 514 may examine the output of the parser 504 at the block 608 for areas of specific capability with respect to that scanner 514. When a scanner 514 identifies data it can process, the scanner creates output specific to the input and then, at a block 610, the scanner 514 may share its output with each of the other scanners 514. For example, the scanner 514-1 may create a mathematical expression and that mathematical expression may be delivered to scanners 514-2 and 514-N. Scanners 514-2 and 514-N may be able to synthesize output based on the mathematical expression from scanner 514-1 that they were not able to process from the direct input from the parser 504. The scanners 514 may utilize the assumption information and may utilize information related to the assumptions such as characteristics or attributes of an assumed entity.

When each scanner 514 can no longer synthesize meaningful output, the results may be passed to the output module 518 at a block 612. At the block 612, each output may be ranked in terms of relevance. Output elements of low relevance optionally may be discarded. At a block 614, output elements that were not discarded at the block 612 may be presented to the user. Output elements may be presented in rank order, or in the case of more common output elements, in a standard presentation format.

When the parser 504 cannot process the input, the 'no' branch from the block 606 may be taken to block 616 and the user may be prompted for more information. Alternatively, the user may be prompted that the input cannot be interpreted and the flow may return to the block 602 to receive a next input.

Figure 9:
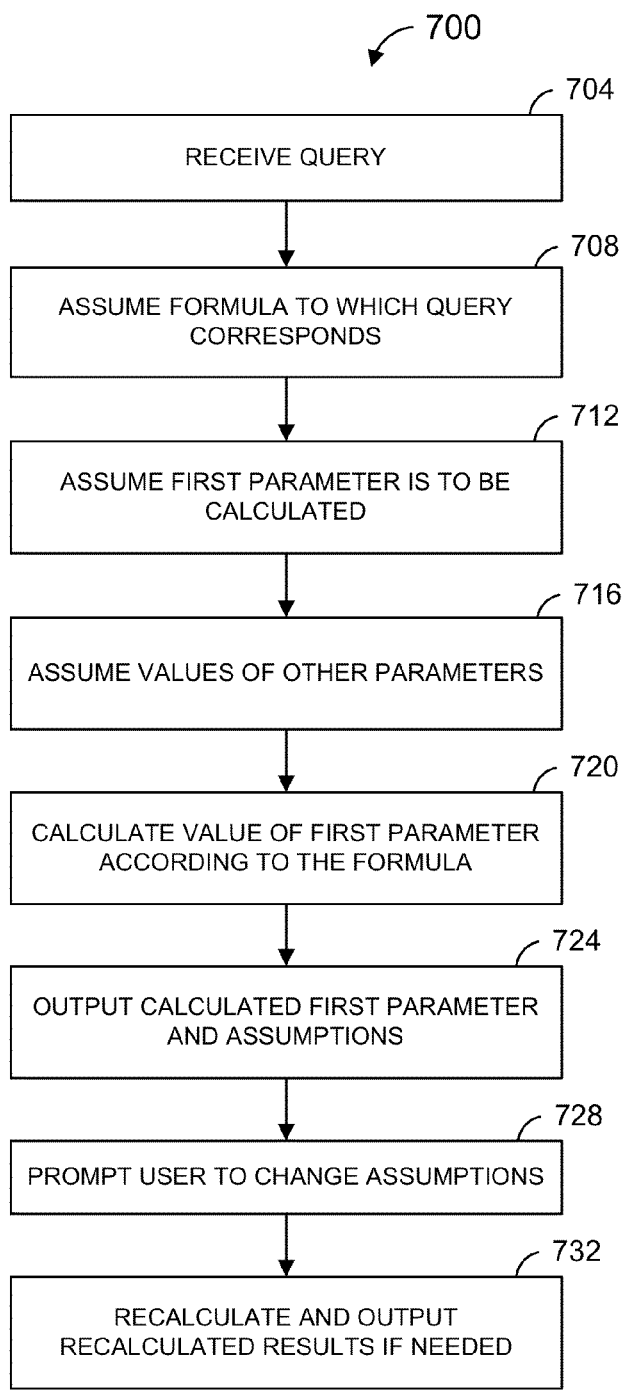
FIG. 9 is a flow diagram of an example method for generating query results when a query is in an imprecise syntax and corresponds to a formula.

FIG. 9 is flow diagram of an example method 700 for providing a response to a query input that relates to a formula and that may be in an imprecise syntax. According to an embodiment, the method 700 is implemented by the system 500 of FIG. 7 and will be described with reference to FIG. 7 for ease of explanation. It will be understood, however, that the method 700 may be utilized with systems other than the system 500, and that the system 500 may implement methods other than the method 700.

At block 704, a query in an imprecise syntax is received, wherein the query relates to a formula. As just a few illustrative examples, the query may be related to a mortgage payment, Ohm's law, a Doppler shift, compound interest, population growth, etc. At block 708, it is assumed that query relates to the formula. In an embodiment, the assumption system 506 utilizes the assumption engine 508 and the database 510 to determine that the query relates to the formula. As an example, if the query includes the word "mortgage", the assumption system 506 may make an assumption that the query relates to a formula for calculating a monthly mortgage payment. In an embodiment, making an assumption at block 708 includes determining a plurality of assumptions and then choosing one of the assumptions, at least in some circumstances. In an embodiment, block 708 includes implementing one or more blocks similar to one or more of the blocks 108, 112, 116, 120, 124 and/or omits one or more of blocks 108, 112, 116, 120 of FIG. 1. In other embodiments, block 708 is implementing using another suitable method for making an assumption regarding the formula to which a query corresponds.

At block 712, it is assumed that a first parameter in the formula is to be calculated according to the formula. As an illustrative example in which Ohm's law (V=IR) is the formula, it may be determined that current (I) is to be calculated. Making an assumption regarding the parameter to be calculated may include one or more of analyzing the query, analyzing user behavior to determine what parameter is most often sought by the user that entered the query and/or other users, etc. As an example, if the formula is Ohm's law and query includes a first number with a "v" next to the first number (e.g., "10v") and a second number with the word "ohms" next to the second number (e.g., "750 ohms"), it may be assumed that the parameter to calculate is current (I). As another example, if the formula is Ohm's law and query includes a number with a "v" next to the number (e.g., "10v") and the user and/or users more often seek to calculate resistance (R) as compared to current (I), it may be assumed that the parameter to calculate is resistance (R).

At block 716, values of other parameters in the formula are assumed. Making an assumption regarding the values of other parameters may include one or more of analyzing the query, retrieving values from a database, etc. As an example, if the formula is Ohm's law and query includes a first number with a "v" next to the first number (e.g., "10v") and a second number with the word "ohms" next to the second number (e.g., "750 ohms"), it may be assumed that the value of the voltage (V) parameter is 10 Volts and the value of the resistance (R) parameter is 750 Ohms. As another example, if the formula is Ohm's law and query includes a number with a "v" next to the number (e.g., "10v") and it has been assumed that the parameter to be calculated is resistance (R), a value of the current (I) parameter, such as 1 Amp, may be retrieved from a database such as the entities database 510, a database external to the system 500 but to which the system 500 is communicatively coupled via a network, for example, such as the Internet, a local area network, a wide area network, etc. For example, the entities database 510 or another database of the system 500 may include default values of voltage, current, and resistance in association with Ohm's law, and the assumption engine 508 may utilize default values for parameter values not specified in the query.

At block 720, a value of the first parameter is calculated according to the formula and utilizing the values assumed at block 716. In the system 500, one of the scanners 514 calculates the value of the first parameter. At block 724, the calculated value of the first parameter, along with indications of the assumptions made at blocks 708, 712, and 716 are output. The block 724 may include generating a web page or window that displays the calculated value of the first parameter and the indications of the assumptions made at blocks 708, 712, and 716.

At block 728, the user is prompted to change one or more of the assumptions made at blocks 708, 712, and 716. The block 728 may include providing one or more user interface mechanisms to permit the user to change one or more assumptions. In an embodiment, the user interface mechanisms are included in a web page or window that also displays the calculated value of the first parameter and the indication of assumptions made. At block 732, a recalculation is performed if the user changed one or more assumptions, and the result of the recalculation is output. The recalculation includes recalculating the first parameter if the user did not choose to change the assumption made at the block 712. The recalculation includes calculating a value of a different parameter if the user chose to change the assumption made at the block 712. The block 728 may include generating a web page or window that displays the recalculation result and indications of the assumptions used to perform the recalculation.

The example method 700 may be modified in various suitable ways. For example, with respect to blocks 708 and 712, the values of at least some parameters may be assumed prior to assuming which parameter value is to be calculated. As another example, with respect to blocks 716 and 720, a user may be prompted to supply values of one or more parameters prior to calculating the value of the first parameter (block 720). As yet another example, with respect to the blocks 724 and 728, the calculated first parameter value, the assumptions made, and the prompting of the user to change assumptions need not be presented in a single web page or window, but instead could be presented in a plurality of different windows. One or ordinary skill in the art will recognize other suitable modifications to the example method 700.

FIG. 10 is an illustration of an example display 750 that may be utilized in an implementation of a method such as the method 700 of FIG. 9. The example display 750 is configured to permit a user to enter a query, such as a query in an imprecise syntax. The display 750 may be part of a web page, window, etc., for example. In FIG. 10, a query has been entered: "100 pF series capacitance." The query has been entered into a text box 754 by a user. In response, an assumption of a formula corresponding to the query has been generated. In particular, it is assumed that the query corresponds to the formula for determining an equivalent capacitance for two capacitors in series (i.e., $$\frac{1}{C} = \frac{1}{C_1} + \frac{1}{C_2},$$

where C is the equivalent capacitance, $C_1$ is the capacitance of a first capacitor, and $C_2$ is the capacitance of a second capacitor in series with the first capacitor. Additionally, an assumption is made that the value of the equivalent capacitance C is to be generated. Further, an assumption is made that "100 pF" in the query was intended to mean that one of the value of one of the series capacitors is 100 pF (i.e., $C_1$=100 pF). Still further, an assumption is made that the value of the other capacitor is 20 pF (i.e., $C_2$=20 pF). The value of $C_2$ was retrieved from a database as a default value of $C_2$, for example.

Some of the assumptions made are displayed in a portion 758 of the display 750. For example, the portion 758 includes an indication 762 of the assumption that the value of the equivalent capacitance C is to be generated. The portion 758 also includes an indication 766 of the assumption that the value of $C_2$ is 20 pF. Some of the assumptions are also displayed in a portion 770 of the display 750. For example, the portion 770 includes an indication 774 of the assumption that the value of $C_1$ is 100 pF, and includes and indication 778 of the assumption that the value of $C_2$ is 20 pF. An indication 782 of the assumed formula is also displayed.

The value of the equivalent capacitance C given that $C_1$ is 100 pF and $C_2$ is 20 pF is calculated, and an indication 784 of the calculated value of equivalent capacitance C is also displayed.

The display 750 includes user interface mechanisms to change some of the assumptions. For example, the indication 766 of the assumed value of $C_2$ is displayed in a textbox 786. The user can enter a different value for $C_2$ in the text box 786 and then have a different equivalent capacitance C value calculated. The display 750 also includes a pull down menu mechanism 788 to permit a user to select a different parameter value to be calculated.

FIG. 11 is an illustration of the display 750 after the user has typed in a different value 790 in the text box 786. In response, a button 792 is displayed. When the user activates the button 792, a new value of equivalent capacitance C is calculated with $C_2$=10 pF.

Figure 12:
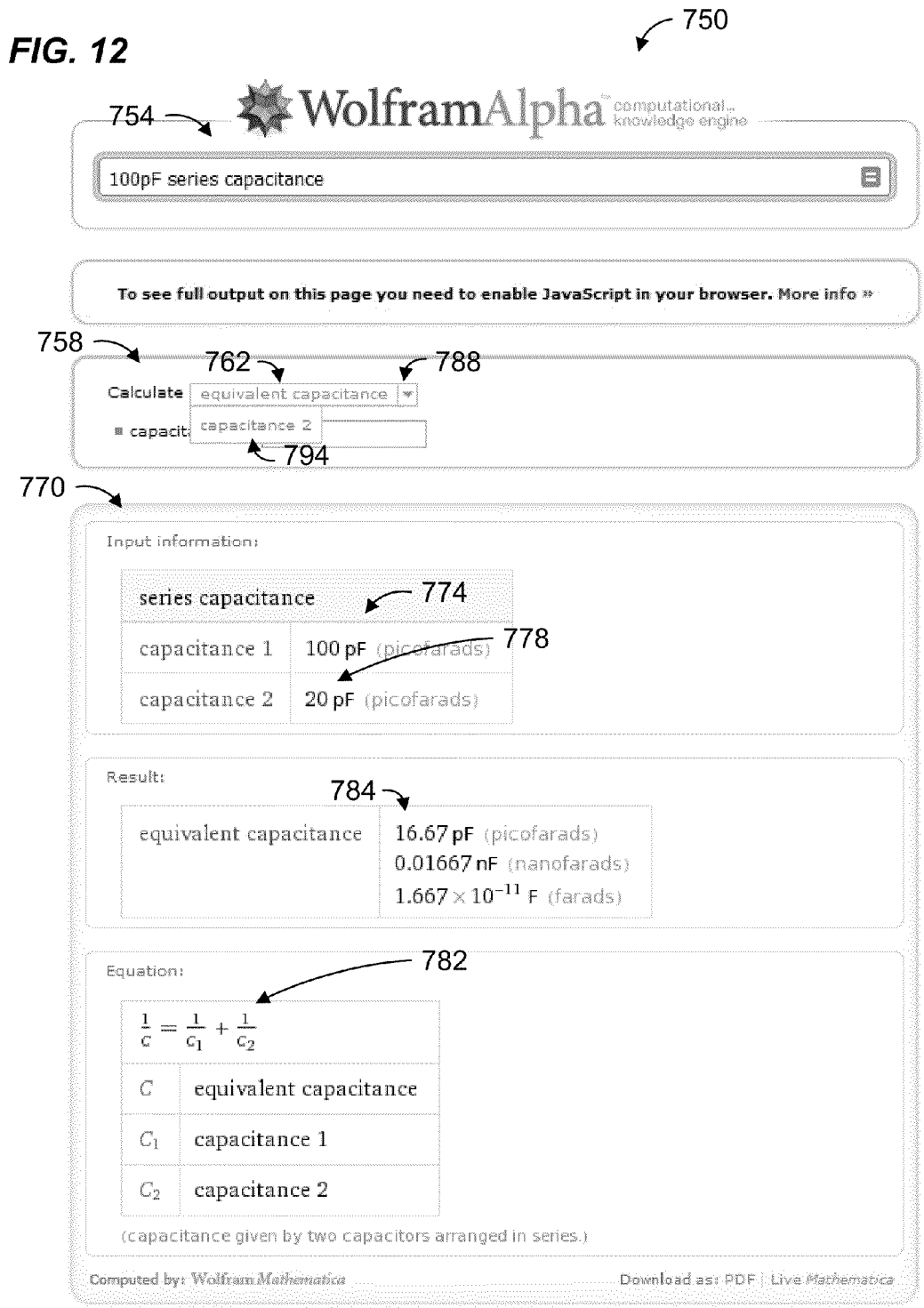
FIG. 12 is yet another illustration of the example display of FIG. 10.

FIG. 12 is an illustration of the display 750 after the user has activated the button 788. In response, a pull down menu 794 is displayed, wherein the pull down menu 794 includes the item "capacitance 2". When the user activates the item "capacitance 2", a new assumption is made that the value to be calculated is $C_2$, assuming values of C and $C_1$.

Figure 13:
FIG. 13 is still another illustration of the example display of FIG. 12.

FIG. 13 is an illustration of the display 750 after the user has activated the item "capacitance 2" in the pull down menu 794 of FIG. 12. In response, the display 750 shows an indication 795 of the assumption that value to be calculated is $C_2$. The display 750 also displays indications 796 and 797 of the assumed value of the equivalent capacitance C. The value of the equivalent capacitance $C_2$ given that $C_1$ is 100 pF and C is 10 pF is calculated, and an indication 798 of the calculated value $C_2$ is also displayed.

FIG. 14 is an illustration of an example display 820 that may be utilized in an implementation of a method such as the method 700 of FIG. 9. The example display 820 is configured to permit a user to enter a query, such as a query in an imprecise syntax. The display 820 may be part of a web page, window, etc., for example.

In FIG. 14, a query has been entered: "mortgage 200000." The query has been entered into a text box 824 by a user. In response, assumptions of formulas corresponding to the query have been generated. For instance, it is assumed that the query corresponds to 1) a formula for calculating the monthly payment for a fixed-rate mortgage loan; and 2) a formula for calculating the effective interest rate for a fixed-rate mortgage loan. Additionally, an assumption is made that "200000" in the query was intended to specify the loan amount. Further, an assumption is made that the period of the loan is 30 years. Still further, an assumption is made that the annual percentage rate of the loan is 5.15%.

Some of the assumptions made are displayed in a portion 828 of the display 820. For example, the portion 828 includes an indication 832 of the assumption that the formula is for a fixed rate mortgage. The portion 828 also includes an indication 834 of the assumption that the loan period is 30 years. The portion 828 also includes an indication 836 of the assumption that the annual percentage rate is 5.15%. The portion 828 also includes an indication 838 that it is assumed that the user specified the loan amount rather than the purchase price and down payment.

Some of the assumptions are also displayed in a portion 844 of the display 820. For example, the portion 844 includes an indication 848 of the assumption that the loan amount is $200,000 U.S. dollars. The portion also includes an indication 850 of the assumption that the loan period is 30 years. The portion also includes an indication 852 of the assumption that the annual percentage rate is 5.15%.

The monthly payment amount for a 30-year mortgage with a fixed annual interest rate of 5.15% and a loan amount of $200,000 is calculated, and an indication 860 of the calculated monthly payment is also displayed. Additionally, the effective interest rate for a 30-year mortgage with a fixed annual interest rate of 5.15% is calculated, and an indication 862 of the calculated effective interest rate is also displayed.

The display 820 includes user interface mechanisms to change some of the assumptions. For example, the indication 834 of the assumed loan period is displayed in a textbox 868. The user can enter a different value for the loan period in the text box 868 and then have a different monthly payment calculated. The indication 836 of the assumed annual percentage rate is displayed in a textbox 870. The user can enter a different value for the annual percentage rate in the text box 870 and then have a different monthly payment and a different effective interest rate calculated.

Other user interface mechanisms to change assumptions include a link 874 to assume an adjustable rate mortgage, a link 876 to specify a purchase price and a down payment instead of the loan amount, a link 878 to consider points, a link 880 to assume an interest-only period, a link 882 to consider a tax rate, and a link 884 to consider a balloon payment.

The assumptions made as illustrated in FIG. 14 can be made using a variety of suitable techniques. For example, a database, such as the entities database 510 (FIG. 7) or another database, can store default values of parameters related to mortgage formulas. Additionally, statistics regarding the user or users in general can indicate what types of mortgages the user or users in general typically inquire about.

Figure 15:
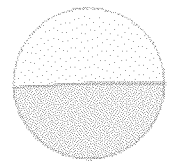
FIG. 15 is another illustration of the example display of FIG. 14.

FIG. 15 is an illustration of the display 820 after the user has activated the link 876 shown in FIG. 14. In response, the display 820 shows an indication 886 of the assumption that a purchase price and a down payment are being utilized. An indication 887 of an assumed purchase price and an indication 888 of an assumed down payment percentage are displayed. The indication 887 of the assumed purchase price is displayed in a text box 890, and the user can change the assumption of the purchase price by typing a new value in the text box 890. The indication 888 of the assumed down payment is displayed in a text box 892, and the user can change the assumption of the down payment by typing a new value in the text box 892. A link 896 is provided to permit a user to choose the assumption that the loan amount is specified.

In the portion 844 of the display 820, an indication 898 of the assumed purchase price and an indication 900 of the assumed down payment percentage are displayed.

Figure 16:
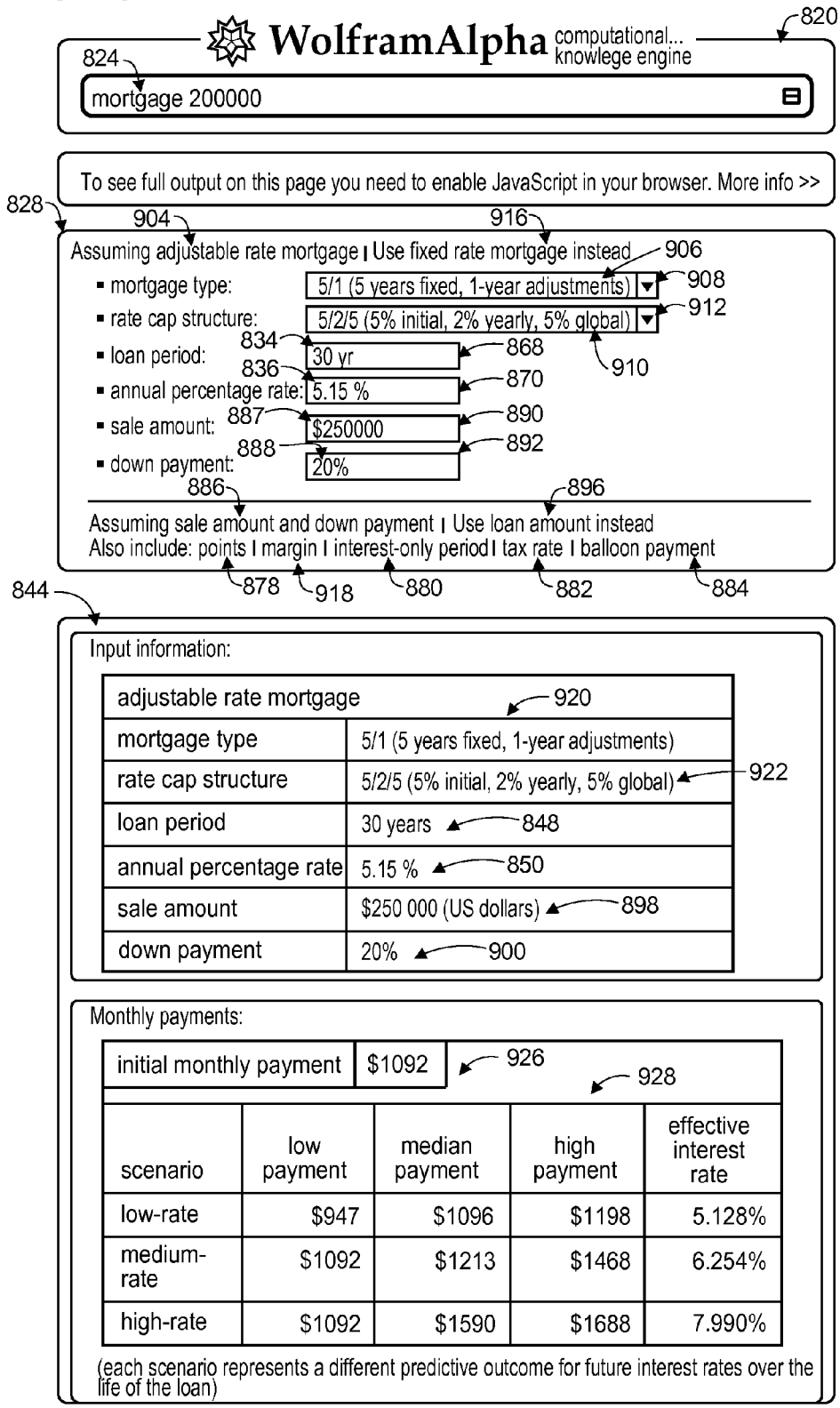
FIG. 16 is another illustration of the example display of FIG. 15.

FIG. 16 is an illustration of the display 820 after the user has activated the link 874 shown in FIG. 15. In response, the display 820 shows an indication 904 of the assumption that the mortgage is an adjustable rate mortgage. An indication 906 of an assumed type of adjustable rate mortgage (e.g., fixed rate for first five years, thereafter annual rate adjustments) is displayed. A pull down menu button 908 permits a user to change the assumption regarding the type of adjustable rate mortgage. For example, the pull down menu may permit the user to select from a mortgage type in which the rate is fixed for the first year, thereafter annual rate adjustments, a mortgage type in which the rate is fixed for the first three years, thereafter annual rate adjustments, and a mortgage type in which the rate is fixed for the first seven years, thereafter annual rate adjustments.

An indication 910 of an assumed rate cap structure (e.g., the rate can adjust initially by a maximum of 5%, thereafter the rate can adjust by a maximum of 2% annually, and the rate can adjust by a maximum of 5% over the life of the mortgage) is displayed. A pull down menu button 912 permits a user to change the assumption regarding the rate cap structure. For example, the pull down menu may permit the user to select from rate cap structures in which the maximum initial change is different than 5%, the maximum annual change is different than 2%, and/or the maximum change of the life of the mortgage is different than 5%.

A link 916 is provided to permit a user to choose the assumption that the mortgage is a fixed-rate mortgage. Additionally, a link 918 is provided to permit a user to choose an assumption related to an interest rate that is based on a margin.

In the portion 844 of the display 820, an indication 920 of the assumed adjustable rate mortgage type and an indication 922 of the assumed rate cap structure are displayed. The initial monthly payment is calculated (assuming an initial rate of 5.15%), and an indication 926 of the initial monthly payment is displayed. Additionally, information regarding the effective interest rate and expected monthly payments under different interest rate scenarios (e.g., low-rate, medium-rate, high-rate) are calculated and displayed in a table 928. The information in the table 928 is calculated using assumed formulas relating to variable rate mortgages and assumed interest rate scenarios.

Figure 17:
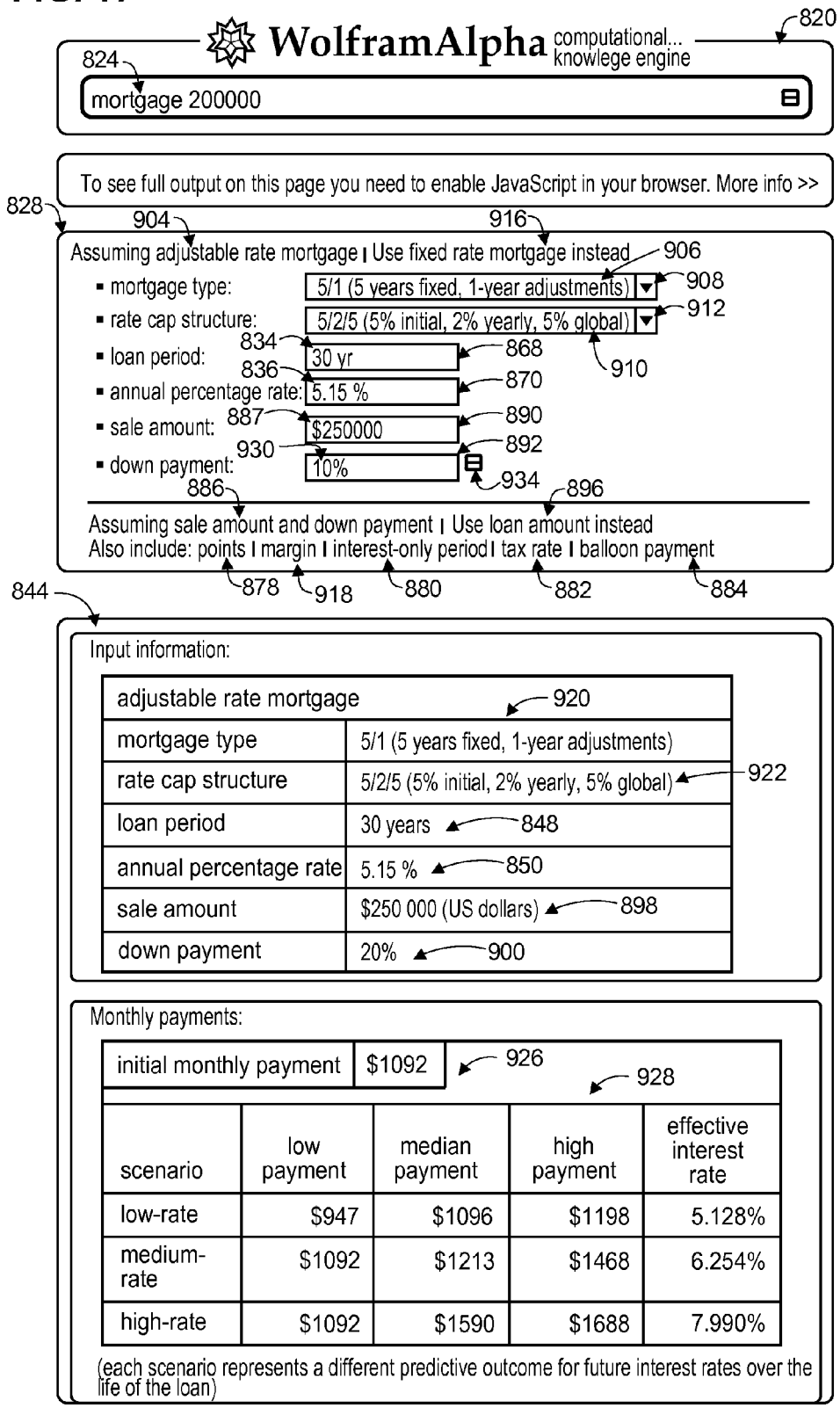
FIG. 17 is another illustration of the example display of FIG. 16.

FIG. 17 is an illustration of the display 820 after the user has typed a value 930 into the text box 892 shown in FIG. 15. In this way, the user can change the assumption made regarding the size of the down payment. The user can then activate a button 934 to cause parameters to be recalculated based on the new down payment.

Figure 18:
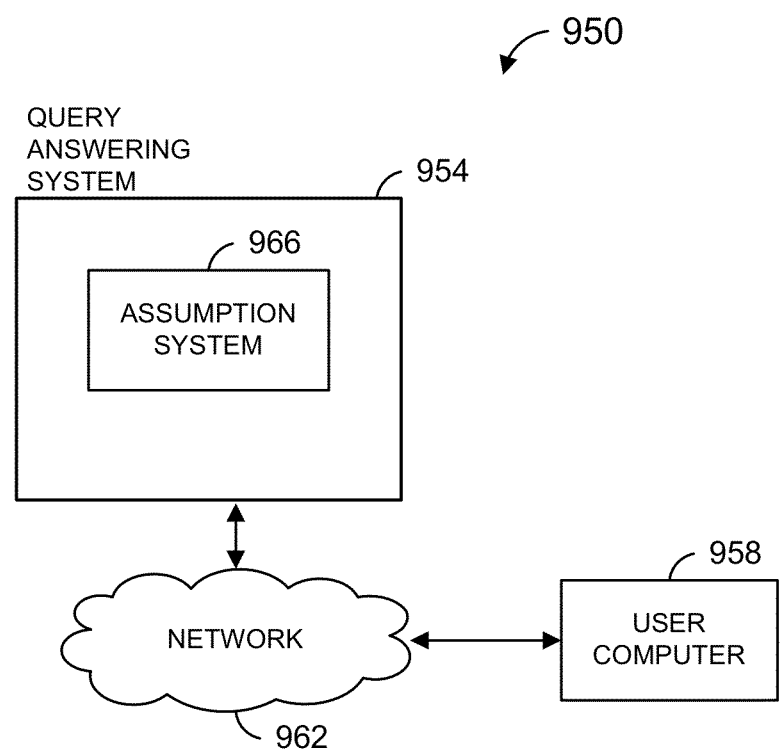
FIG. 18 is a block diagram of an example system for answering queries in an imprecise syntax.

FIG. 18 is block diagram of an example system 950 that includes a query answering system 954 for answering queries in imprecise syntax. The query answering system 954 generates answers to queries as opposed to merely providing links to web pages having words that match words in the query. In other words, the query answering system 954 attempts to understand the meaning of the query and then provides an answer to the query based on the understood meaning. For example, in response to the query "manhattan", the query answering system 954 may determine that "manhattan" can refer to various entities such as the city in New York, various other cities in the United States, the movie "Manhattan", etc. The different entities correspond to different assumptions regarding the meaning of the word "manhattan". The query answering system 954 may then chooses one of assumptions, i.e., chooses an entity, and determines information about the entity to formulate an answer. As another example, in response to the query "mortgage 200000", the query answering system 954 may determine that "mortgage" refers to a plurality of formulas for calculating monthly mortgage payments, effective interest rates, etc. The formula information and/or assumed parameter values may be retrieved from a database of the query answering system 954 or a database communicatively coupled to the query answering system 954. The determined information is then utilized by the query answering system 954 to generate a response to the query.

The system 950 includes a user computer 958 coupled to the query answering system 954 via a communications network 962. The communications network 962 may include a local area network (LAN), a wireless LAN, a wide area network (WAN), a mobile communications network, the Internet, etc.

A user enters a query via the user computer 958. For example, the user may enter a query via a web page or other display that is displayed on a display device of the user computer 958. The user computer 958 then transmits the query to the query answering system 954 via the network. The query answering 954 includes an assumption system 716 that determines and chooses assumptions regarding words, phrases, groups of textual characters, etc., in the query. In an embodiment, the query answering system 954 is implemented on a computer such as a server, a workstation, a mainframe, etc. The query answering system 954 may be a system such as the system 500 of FIG. 7 or another suitable system. The assumption system 716 may include the assumption system 506 of FIG. 7 or another suitable system. The user computer 958, in various embodiments, is a personal computer, a tablet computer, a smart phone, a personal digital assistant (PDA). Each of the device 954 and the device 958 include respective network interfaces to transmit and receive data via the network 962.

An answer to the query, based on assumptions determined and chosen by the assumption system 716, is transmitted by the answering system 954 via the network 962. The answer may be included in a web page or other suitable display, which is displayed on the display device of the user computer 958. In an embodiment, the answering system 954 also transmits indications of the assumptions chosen by the assumption system 716, and transmits these indications via the network 962. In an embodiment, the answering system 954 also transmits indications of other assumptions determined by the assumption system 716, and transmits these indications of other assumptions via the network 962. The indications of the chosen assumptions and/or other determined assumptions are displayed on the display device of the user computer 958. Such displays may include user interface mechanisms (e.g., links, pull-down menus, etc.) to permit a user to select a different assumption using the user computer 958. If the user selects a different assumption, an indication of the selection is transmitted by the user computer 958 to the answering system 954 via the network. In response to receiving the indication of the selection, the answering system 954 determines a new answer to the user query based on the different assumption, and the answer is transmitted to the user computer 958 for display to the user.

In an embodiment, the answering system 954 implements the method 100 of FIG. 1. For example, the blocks 108, 112, 116, 120, 124 may be implemented by the assumption system 716, according to an embodiment. The answering system 954 may generate web pages or displays similar to the example displays of FIGS. 2-6. In an embodiment, the answering system 954 implements the method 700 of FIG. 9. For example, the blocks 708, 712, 716 may be implemented by the assumption system 966, according to an embodiment. The answering system 954 may generate web pages or displays similar to the example displays of FIGS. 2-6 and/or FIGS. 10-17.

In an embodiment, the answering system 954 receives a query in an imprecise syntax from the user computer 958, via the network 962. The answering system 954 assumes a formula to which the query corresponds. The answering system 954 assumes a first parameter of the formula to be calculated. The answering system 954 assumes values of other parameters of the formula. The answering system 954 then calculates a value of the first parameter using the assumptions. Also, the answering system 954 provides a user interface mechanism to permit a user to change assumptions relating to the formula and/or the parameter values. For example, in an embodiment, the answering system 954 provides web pages or windows similar to the example displays of FIGS. 10-17 to the user computer 958. The answering system 954 receives, from the user computer 958 via the network 962, an indication of a selected different assumption selected by the user using a user interface mechanism. The answering system 954 recalculates based on the selected different assumption, and transmits, to the user computer 958 via the network 962, recalculated results.

In an embodiment, the user computer 958 transmits, via the network 962, a query in an imprecise syntax, the query relating to a formula. In response, the user computer 958 receives from the answering system 954, via the network 962, query results that are based on assumptions regarding the formula, and values of parameters of the formula. Additionally, the user computer 958 receives from the answering system 954, via the network 962, indications of the assumptions made by the answering system 954. Also, the user computer 958 receives from the answering system 954, via the network 962, user interface mechanisms to permit changing assumptions made by the answering system 954. The user computer 958 displays the query results, the indications of the assumptions, and the user interface mechanisms to permit changing assumptions on the display device of the user computer 958. For example, in an embodiment, the user computer 958 displays web pages or windows similar to the example displays of FIGS. 10-17, on a display device of the user computer 958.

Any of the techniques described above, including the blocks described with reference to FIGS. 1-18, may be implemented using a processor that executes machine readable software or firmware instructions. Such computer program instructions may control the operation of a computing device such as a desktop computer, a laptop computer, a tablet computer, a workstation, a server, a mainframe, a mobile phone (e.g., a smart phone), a telephone, a set top box, a PDA, a pager, a processing system of an electronic game, a processing system of a consumer electronics device, etc. The computing device may have a processor and a memory in which the computer program instructions may be stored. The processor is coupled to the memory and executes the computer program instructions. The computer program instructions may be written in any high level language such as the programming language used with MATHEMATICA® software systems, C, C++, C#, Java or the like or any low-level assembly or machine language. By storing computer program instructions in a memory of the computing device, the computing device is physically and/or structurally configured in accordance with the computer program instructions.

While many methods and systems have been described herein as being implemented using a processor executing machine readable instructions, they may be implemented at least partially in hardware, and may be implemented by a variety of computing systems and devices. Thus, the method blocks and system blocks described herein may be implemented in a standard multi-purpose central processing unit (CPU), a special purpose CPU, or on specifically designed hardware such as an application-specific integrated circuit (ASIC) or other hard-wired device as desired. When implemented using a processor executing machine readable instructions, the machine readable instructions may be stored in any computer readable memory such as on a magnetic disk, a laser disk (such as a compact disk (CD), a digital versatile disk (DVD)), a flash memory, a memory card, a memory stick, etc., or other storage medium, in a RAM or ROM of a computer or processor, in any database, etc. Likewise, the machine readable instructions may be delivered via any known or desired delivery method including, for example, on a computer readable memory or other transportable computer storage mechanism or over a communication channel such as a telephone line, the internet, etc. (which are viewed as being the same as or interchangeable with providing such software via a transportable storage medium).

The present disclosure has been described with reference to specific examples, which are intended to be illustrative only and not to be limiting. It will be apparent to those of ordinary skill in the art that changes, additions or deletions may be made to the disclosed examples without departing from the spirit and scope of the disclosure. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of this application.

Thus, many modifications and variations may be made in the techniques and systems described and illustrated herein without departing from the spirit and scope of the present invention. Accordingly, it should be understood that the methods and systems described herein are illustrative only and are not limiting upon the scope of the invention.

What is claimed is:

1. A method, comprising:
    receiving a query in an imprecise syntax;
    determining one or more meanings or senses corresponding to a word in the query;
    selecting a meaning or sense to apply to the query;
    determining, according to the selected meaning or sense, a formula relating to the query, the formula for calculating an answer to the query and having one or more parameters;
    determining, according to the selected meaning or sense, one or more assumptions relating to the query, wherein the one or more assumptions includes an assumption that a term of the query corresponds to a value of a parameter of the formula;

choosing one or more of the assumptions from the determined assumptions, including assigning the term of the query to the value;

calculating a first answer to the query in response to the query and according to (i) the formula and (ii) the value of the parameter;

providing, in association with the first answer, user interface mechanisms to (1) permit a user to change the selected meaning or sense or the chosen one or more assumptions on which the first answer was based, and (2) change the value of the parameter; and calculating a second answer to the query in response to and based on the changed meaning or sense or the changed assumption, including calculating the second answer based on a changed value of the parameter.

2. The method according to claim 1, wherein the user interface mechanisms permit the user to select a different assumption from the determined assumptions.

3. The method according to claim 1, wherein the user interface mechanisms comprise at least one of a link, a button, a text box, or a pull-down menu.

4. The method according to claim 1, further comprising generating a web page or window that includes the first answer to the query.

5. The method according to claim 4, wherein the web page or window includes an indication of the chosen assumption.

6. The method according to claim 4, wherein the web page or window includes the user interface mechanism.

7. The method according to claim 1, wherein the one or more determined assumptions include assumptions corresponding to a plurality of different formulas;
   wherein one of the chosen assumptions corresponds to one formula from the different formulas,
   wherein the user interface mechanism permits a user to select another one of the different formulas.

8. The method according to claim 1, wherein the one or more determined assumptions include assumptions corresponding to a plurality of different parameters of a formula for which to calculate a value;
   wherein one of the chosen assumptions corresponds to a first parameter for which to calculate a value;
   wherein the user interface mechanisms permit a user to select a second parameter for which to calculate a value.

9. A tangible, non-transitory storage medium having stored thereon machine executable instructions, the machine executable instructions, when executed by one or more machines, to:
   receive a query in an imprecise syntax;
   determine one or more meanings or senses corresponding to a word in the query;
   select a meaning or sense to apply to the query;
   determining, according to the selected meaning or sense, a formula relating to the query, the formula for calculating an answer to the query and having one or more parameters;
   determine, according to the selected meaning or sense, one or more assumptions relating to the query, wherein the one or more assumptions includes an assumption that a term of the query corresponds to a value of a parameter of the formula;
   choose one or more of the assumptions from the determined assumptions, including assigning the term of the query to the value;
   calculate a first answer to the query in response to the query and according to (i) the formula and (ii) the value of the parameter;
   provide, in association with the first answer, user interface mechanisms to (1) permit a user to change the selected meaning or sense or the chosen one or more assumptions on which the first answer was based, and (2) change the value of the parameter; and
   calculate a second answer to the query in response to and based on the changed meaning or sense or the changed assumption, including calculating the second answer based on a changed value of the parameter.

10. A method, comprising:
    transmitting, via a network, a query in an imprecise syntax;
    receiving, via the network, a query answer generated by performing a calculation in response to the query based on a formula relating to the query, the formula determined according to a meaning or sense of a word in the query, and wherein the calculation is performed based on (1) an assumption chosen from one or more assumptions relating to the meaning of the query, and (2) an assumption chosen from one or more assumptions that a term of the query corresponds to a value of a parameter of the formula;
    receiving, via the network, an indication of the determined meaning or sense of the word in the query, and an indication of the chosen assumption of the term of the query that corresponds to the value of the parameter of the formula;
    receiving, via the network and with the query answer, user interface mechanisms to permit selection of another meaning or sense of the word in the query or of another assumption from the one or more assumptions, including a first user interface mechanism to change the value of the parameter;
    displaying the query answer, the indication of the determined meaning or sense of the word in the query, the indication of the chosen assumption, and the user interface mechanisms to permit selection of another meaning or sense of the word in the query or another assumption from the one or more assumptions on a display device;
    permitting selection, using the user interface mechanisms, of another assumption from the one or more assumptions;
    transmitting, via the network, an indication of the selected another assumption; and
    receiving a different query answer in response to and based on the selected another assumption.

11. The method according to claim 10, wherein the user interface mechanisms comprise at least one of a link, a button, a text box, or a pull-down menu.

12. The method according to claim 10, wherein the query answer, the indication of the chosen assumption, and the user interface mechanisms are displayed in a web page or window.

13. The method according to claim 10, wherein the one or more assumptions include assumptions corresponding to a plurality of different formulas;
    wherein the chosen assumption corresponds to one formula from the different formulas
    wherein the user interface mechanism permits a user to select another one of the different formulas.

14. The method according to claim 10, wherein the one or more assumptions include assumptions corresponding to a plurality of different parameters of a formula for which to calculate a value;
    wherein the chosen assumption corresponds to a first parameter for which to calculate a value;
    wherein the user interface mechanism permits a user to select a second parameter for which to calculate a value.

15. A tangible, non-transitory storage medium having stored thereon machine executable instructions, the machine executable instructions, when executed by one or machines, to:

cause a query in an imprecise syntax to be transmitted via a network;

receive, via the network, a query answer generated by performing a calculation in response to the query, based on a formula relating to the query, the formula determined according to a meaning or sense of a word in the query, and wherein the calculation is performed based on (1) an assumption chosen from one or more assumptions relating to the meaning of the query, and (2) an assumption chosen from one or more assumptions that a term of the query corresponds to a value of a parameter of the formula;

receive, via the network and with the query answer, an indication of the determined meaning or sense of the word in the query and an indication of the chosen assumption of the term of the query that corresponds to the value of the parameter of the formula;

receive, via the network, user interface mechanisms to permit selection of another meaning or sense of the word in the query or of another assumption from the one or more assumptions, including a first user interface mechanism to change the value of the parameter;

cause the query answer, the indication of the determined meaning or sense of the word in the query, the indication of the chosen assumption, and the user interface mechanisms to permit selection of another meaning or sense of the word in the query or another assumption from the one or more assumptions to be displayed on a display device;

receive a selection, using the user interface mechanisms, of another assumption from the one or more assumptions;

transmit, via the network, an indication of the selected another assumption; and receive a different query answer in response to and based on the selected another assumption.

\* \* \* \* \*

UNITED STATES PATENT AND TRADEMARK OFFICE
CERTIFICATE OF CORRECTION

PATENT NO. : 8,788,524 B1
APPLICATION NO. : 12/780705
DATED : July 22, 2014
INVENTOR(S) : Stephen Wolfram et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 284 days.

Signed and Sealed this
First Day of September, 2015

Michelle K. Lee
*Director of the United States Patent and Trademark Office*